United States Patent [19]

Okumura

[11] Patent Number: 4,967,729
[45] Date of Patent: Nov. 6, 1990

[54] SOLAR-SYSTEM HOUSE

[75] Inventor: Akio Okumura, Tokyo, Japan

[73] Assignee: Kabushiki Kaisha Ohem Kenkyujyo, Shizuoka, Japan

[21] Appl. No.: 373,104

[22] Filed: Jun. 28, 1989

[51] Int. Cl.⁵ ............................................. E04D 13/18
[52] U.S. Cl. .................................. 126/428; 126/430; 126/431; 165/48.2
[58] Field of Search ................................. 126/428–432, 126/450, 400, 422; 165/18, 10, 48.2; 98/31

[56] References Cited

U.S. PATENT DOCUMENTS

| | | | |
|---|---|---|---|
| 3,412,728 | 11/1968 | Thomason | 126/429 |
| 4,127,973 | 12/1978 | Kachadorian | 126/431 |
| 4,143,815 | 3/1979 | Meysenberg | 126/428 |
| 4,244,519 | 1/1981 | Zornig et al. | 126/428 |
| 4,324,289 | 4/1982 | Lahti | 126/430 |

FOREIGN PATENT DOCUMENTS

| | | | |
|---|---|---|---|
| 2492955 | 4/1982 | France | 126/430 |
| 211639 | 9/1986 | Japan | 126/429 |
| 63-165633 | 7/1988 | Japan . | |
| 64-48550 | 3/1989 | Japan . | |
| 64-75858 | 3/1989 | Japan . | |

Primary Examiner—James C. Yeung
Attorney, Agent, or Firm—Koda & Androlia

[57] ABSTRACT

A solar heating system for a house which utilizes air heated by solar energy including a solar energy collector forming an air flow path having an ambient air intake at one end and located directly under the roof plates along a pitched roof, a duct provided with a fan to introduce heated air from the solar energy collector to areas under the floor, and a heat accumulation and release system forming an air flow space under the floor and having openings for releasing hot air into the rooms of the house.

3 Claims, 3 Drawing Sheets

SOLAR-SYSTEM HOUSE

BACKGROUND OF THE INVENTION

1. Field of the Invention

This invention relates to a solar heating system for a house which uses air heated by solar energy as a heating source.

2. Prior Art

It is known in the art to have a large opening on the south side of a house to introduce sunshine in the winter and fresh air in the summer. It is also known to place a sunroom next the living room to be used as a green house from which heated air can be introduced into the living room.

In the above cases, only the air accumulates heat. However, as shown in FIG. 5, when the outer surface of a concrete wall 1 is covered with glass plates 2 to form an air circulation path 4 to the room 3, the outside wall 1 itself acts as a heat accumulator which provides stable heat to the room 3.

Nevertheless, these methods have disadvantages with regard to application and control over only those rooms which are facing south since these methods induce great temperature differences between the controlled room and the rooms facing north.

SUMMARY OF THE INVENTION

In view of the problems found in the prior art, it is a primary object of the present invention to provide a solar heating system for a house which effectively uses air heated by the sun regardless of the direction the rooms face and resolves the existing problems found in conventional solar heating systems.

To solve the problems found in the prior art and achieve the object of the invention, the heating system of the present invention basically includes a solar energy collector with an air flow path having an air intake at one end placed directly under roof plates along a pitched roof, a duct provided with a fan to supply heated air from the solar energy collector to areas under the floor, and a heat accumulation and release system forming an air flow space under the floor for diffusing hot air through openings to the rooms.

In particular, the roof plates which are heated by the rays of the sun heat the ambient air which is introduced to the air flow path. The heated air ascends along the slope of the air flow path and is sent to a descending duct by a fan and enters the heat accumulation and release system under the floor.

Once in the heat accumulation and release system, the heated air which is sent from the duct passing through the air flow path performs three functions: direct heating of the floor, providing heat to an accumulator (such as a concrete slab) and direct heating of a room by releasing hot air thereinto.

While heating rooms, fresh heated air is continuously supplied to the rooms and the cold outside air is prevented from entering through gaps in the windows or walls.

According to the present invention, it is a common practice during winter to close the exhaust duct connection and to open the descending duct connected to the inlet of a heating control box using a first damper plate, and to shut-off the opening between the descending duct and the exhaust duct using the second damper plate. Thus, the heated air at the solar energy collector passes through the fan in the control box and descends in the descending duct to heat the floor.

During the summer when heating is not needed, the air flow path to the descending duct is closed using the primary damper plate, and the opening between the descending duct and the exhaust duct is shut-off using the secondary damper plate. When the fan is operating in this situation, the heated air from the solar energy collector passes through the control box and is vented from the exhaust duct.

Under these circumstances, if the secondary damper plate is shifted to open the air flow path between the descending duct and the exhaust duct, the air which is directly sent from the fan to the exhaust duct creates a suction force toward the descending duct due to the conical shape of the exhaust duct. This suction force propels the air under the floor to the exhaust duct via the descending duct and carries out ventilation under the floor simultaneously.

DETAILED DESCRIPTION OF THE INVENTION

The present invention will be described in greater detail referring to the accompanying drawings which illustrate an embodiment thereof.

Figure 1:
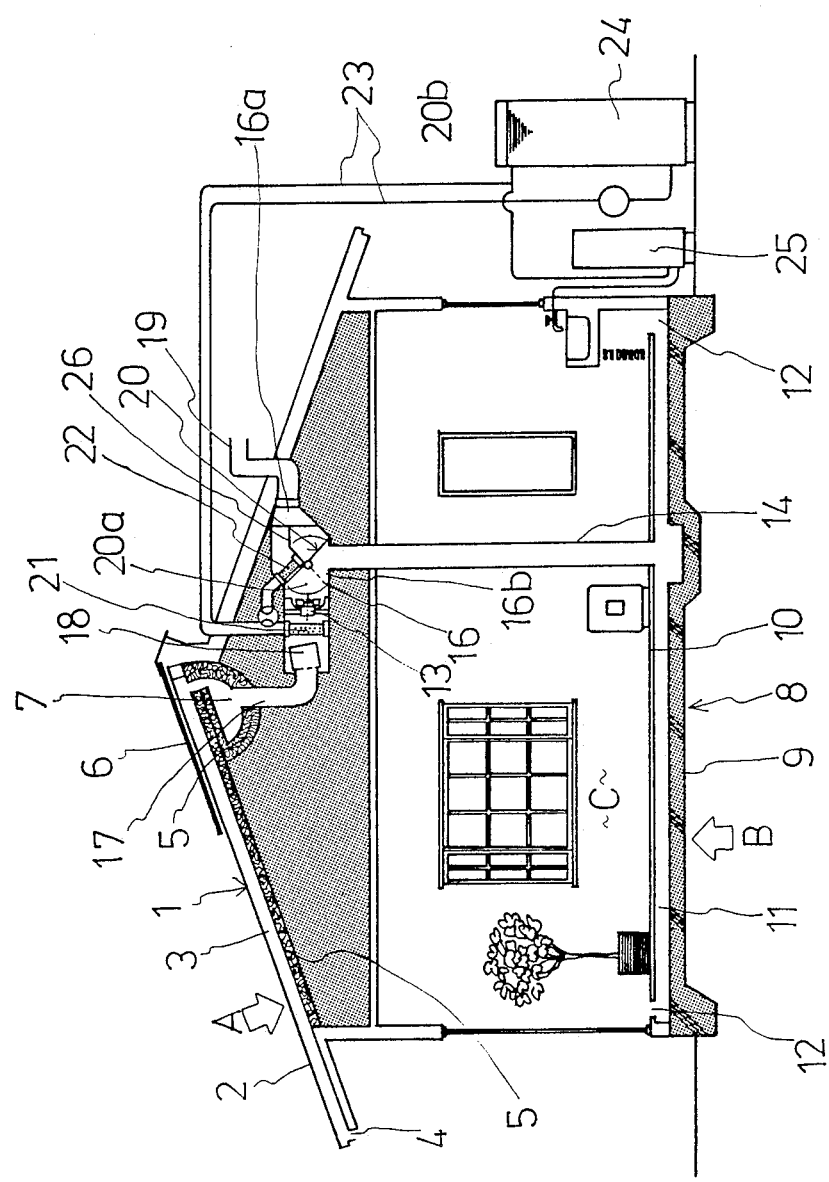
FIG. 1 shows a front view of a longitudinal section of a typical solar heating system for a house as provided by the present invention.

FIG. 1 shows a typical arrangement of the present invention. The roof 1 holds a solar energy collector A which includes an air flow path 3 along the pitched roof by securing a space directly under the metal plates 2 of the roof plates (a kind of roofing) and an ambient air intake 4 at the ends of the eaves or another location which opens at an end of the air flow path 3.

The bottom surface of the air flow path 3 is constructed with a heat insulation layer 5 which consists of heat insulating materials such as glass wool, etc. and the glass plates 6 are placed on top of the metal plates 2 at the top area of the roof 1.

As for heat collectors which are assembled using only metal plates, the maximum temperature of the heated air is limited because as the metal plates accept solar energy, they dissipate heat to the atmosphere. By covering the metal plates 2 with glass plates 6, the upper limit of the temperature of the heated air is raised to enable heat collection at a higher temperature. Furthermore, the effect of external wind on the heat collection temperature is minimized.

Along the ridge of the roof 1, a ridge duct 7 is formed which is surrounded by a heat insulation layer 5. The ridge duct 7 is connected to the air flow path 3. The ridge duct 7 functions as a heat collection space for the solar energy collector A.

The floor 8 functions as a heat accumulation and release system B, which forms an air flow space 11 between the concrete slab 9 and floor panel 10. The air flow space 11 is provided with diffusers 12 which open into the room space C.

The solar energy collector A on the roof 1 and the heat accumulation and release system B under the floor 8 are connected via a descending duct 14. A fan 13 is located along this connecting route.

Figure 2:
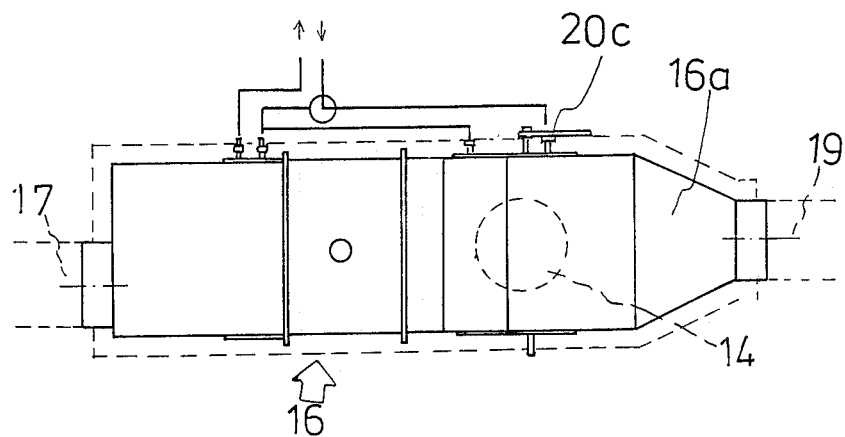
FIG. 2 shows a plan view thereof.
Figure 3:
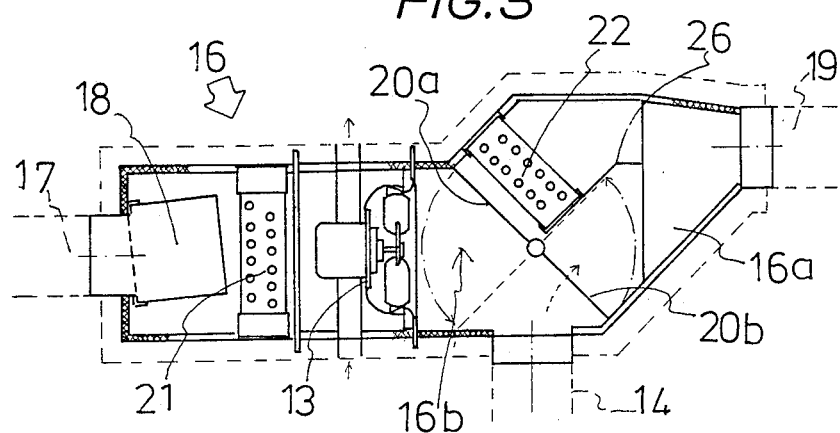
FIG. 3 shows a front view in longitudinal section of the control box of the present invention.
Figure 4:
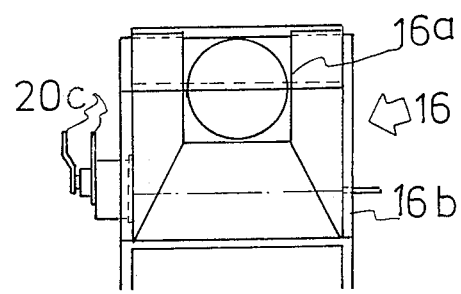
FIG. 4 shows an elevational view in longitudinal section of the control box of the present invention.
Figure 5:
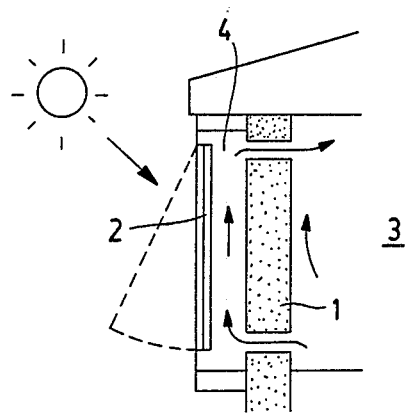
FIG. 5 shows a front view of a longitudinal section of a conventional system.

A control box 16 is located between the ridge duct 7 and the descending duct 14. The control box 16 contains the fan 13. As shown in FIGS. 2, 3 and 4, a check damper 18 is provided at the inlet of the control box 16, and the fan 13 is installed on the downstream side, close to the damper 18. At the discharge side of the fan 13 an air flow connection is created between the descending duct 14 and the exhaust duct 19. The exhaust duct 19 has a conical section 16a whose inner diameter gradually decreases toward the exhaust duct 19.

The enlarged space 16b is formed between the conical part 16a and the fan 13. The descending duct 14 is opened to the bottom of the enlarged space 16b. In the enlarged space 16b there is a partition plate 26 extending from the center of the space 16b to the middle of the conical part 16a, and an air flow-change damper 20 is hinged at the end of the partition plate 26.

The flow-change damper 20 includes a primary damper plate 20a, which connects either the inlet of the control box 16 holding the fan 13 to the descending duct 14 or the inlet of the control box 16 to the exhaust duct 19 via both the conical part 16a and one side of the sections divided by the partition plate 26. The flow-change damper 20 also has a secondary damper plate 20b, to shut-off connections between the descending duct 14 and the exhaust duct 19 via the other side of the sections divided by the partition plate 26.

The flow-change damper 20 is operated either manually or electrically. In particular, motor driven and manual handles 20c for rotating the damper plates 20a and 20b are mounted on the outside of the control box 16.

Various types of fans may be used for the fan 13. For example, a sirocco fan, axial fan or steplessly adjustable flowrate type using a regulator to control the temperature and quantity of heat collection may be used.

Heat exchangers 21 and 22 are installed in the control box 16. The first heat exchanger 21 is located between the check damper 18 and the fan 13, and the second heat exchanger 22 is located in the enlarged space 16b in the section divided by the partition plate 26 to connect the fan 13 with the exhaust duct 19. Both heat exchangers 21 and 22 are connected to a hot water storage tank 24 via circulation piping 23, consisting of feed and return piping. The hot water storage tank 24 is supported by a supplemental hot water boiler 25 and is connected to hot water tubes for supplying hot water to the bathroom and kitchen.

To fully utilize solar energy in the winter, the primary damper plate 20a of the flow-change damper 20 is positioned to close the opening to the exhaust duct 19, and the secondary damper plate 20b is positioned to shut-off the connection between the descending duct 14 and the exhaust duct 19.

In the daytime, the rays of the sun heat the metal plates 2 on the roof 1. The temperature of the metal plates 2 increases on the area covered by the glass plates 6 due to decreased heat dissipation. The air in the air flow path 3, which is located directly under the metal plates 2, is heated by the metal plates 2 and ascends along the pitched roof to enter the ridge duct 7; that is, the heat collection space. At the same time, fresh ambient air is introduced from the ambient air intake 4 into the air flow path 3 and is heated.

When the fan 13 is operated, the heated air generated in the solar energy collector A on the roof 1 as described above is collected in the ridge duct 7. The heated air then enters the control box 16 via the duct 17 by opening the damper 18 with the flow pressure and heats the first heat exchanger 21.

After heating the heat exchanger 21, the heated (hot) air flows into the air flow space 11 under the floor 8 via the descending duct 14.

The heated air sent to the air flow space 11 is diffused out from the diffusion vents 12 into the room space C, providing warm air heating. Since the room space C is continuously fed with the heated air by the fan 13, no external cold air enters from gaps around windows or walls; rather the heated air can flow out through any gaps.

The hot air which enters the air flow space 11 heats the floor by directly heating the floor panel 10, and the air further heats the concrete slab 9, which thus accumulates heat.

In the heat exchanger 21, the water supplied from the feed piping 23 is heated by the heated air and returns to the hot water storage tank 24 via the return piping 23. The hot water returned to the hot water storage tank 24 is directly fed to or further heated by the supplemental hot water boiler 25 and fed to various places in the house through hot water supply tubes.

In the above illustrated solar heating system for a house, during the night hot air flows up from under the floor through the descending duct 14 as a chimney.

During clear winter nights, the roof surface is cooled by sky radiation, and the cooled air in the heat collection air layer descends along the pitched roof.

These two phenomena are the driving forces which generate reverse air flow against heat collection. When reverse flow occurs, air having the humidity of a room or the space under the floor flows up to the surface of the roof and induces condensation.

When the operation of the fan 13 is stopped, the damper 18 is automatically closed by its dead weight to shut-off the heat collection circuit. As a result, the heated air in the room space C and under the floor panel 10 is not vented and no fresh air is fed to the air flow path under the roof, thus condensation is prevented. In addition, heat released from the concrete slab 9 under the floor panel 10 continues to the heat the floor.

When it is unnecessary to heat the house, as in the summer, the opening of the descending duct 14 to the enlarged space 16b is closed by the primary damper plate 20a of the flow-change damper 20. This allows heated air generated in the solar energy collector A to flow into the control box 16 and heat the heat exchangers 21 and 22 to make hot water and is then vented through the exhaust duct 19.

Thus, during the summer the heated air circuit is only used as a hot water supply system. In this respect, the heat exchanger 22 is provided close to the heat exchanger 21 so that the system can produce hot water by more effectively using solar energy. In addition, the damper 18 is closed to prevent condensation from forming on the surface of the roof, except when heat is being collected.

When the heat is released through the exhaust duct 19, the exhaust duct 19 and the descending duct 14 communicate by raising the secondary damper plate 20b of the damper 20 onto the partition plate 26.

Thus, air flow sent directly from the fan 13 to the exhaust duct 19 increases its velocity at the conical section 16a and creates a vacuum in the other section divided by the partition 26, or the section connected to the descending duct 14.

As a result, air descending the duct 14 is sucked into the exhaust duct 19, thus providing ventilation to the air flow space 11 under the floor panel 10.

As described above, the solar heating system of the present invention provides effective heating regardless of the direction that the subject rooms face by introducing air which is heated by the rays of the sun which strike the roof of the house. When heating is not necessary, the solar heating system effectively vents and releases heated air by operation of a fan.

Furthermore, the solar heating system of the present invention is able to ventilate areas under the floor of the house by utilizing the suction force induced by the ventilation system. With these advantages, the solar heating system of the present invention provides a home with an economical solar heating system and a comfortable living environment.

What is claimed:

1. A solar heating system for a house comprising:
   a solar heating collector in the form of a roof of said house, said solar heating collector having a solar heat absorbing plate in the form of a roof plate and an air flow path provided directly beneath and along said roof plate, said air flow path having an air intake;
   a duct means provided for a circulation of air, said duct means being connected to said air flow path and comprising a ridge duct provided under said roof, a descending duct which is provided in said house, and an exhaust duct for sending air out of said house;
   a heat accumulation and releasing means in the form of a floor of said house, said means taking in heat absorbed by said solar heat collector through said duct means and having a concrete slab, a floor panel and an air flow space formed between said concrete slab and said floor panel, said air flow space having outlet openings for a room space of said house; and
   a control box coupling together said ridge duct, descending duct and exhaust duct, said control box having a damper provided between an input of said control box and said ridge duct so as to prevent air from flowing back from said control box to said ridge duct, a fan for blowing said air, and a flow change damper for connecting and disconnecting said ridge duct to said descending duct and exhaust duct and for connecting and disconnecting said descending duct and exhaust duct.

2. A solar heating system for a house according to claim 1, wherein a section which connects said control box to said exhaust duct is in a conical shape whose inner diameter gradually decreases toward said exhaust duct.

3. A solar heating system for a house according to claim 1, further comprising a heat exchanger provided in said control box.

* * * * *